United States Patent Office 3,370,093
Patented Feb. 20, 1968

3,370,093
PROCESS FOR PREPARING BENZYL ETHERS
Juan Longoria III, Lake Jackson, Tex., assignor to American Potash & Chemical Corporation, Los Angeles, Calif., a corporation of Delaware
No Drawing. Filed Aug. 16, 1962, Ser. No. 217,260
1 Claim. (Cl. 260—611)

This invention relates to certain benzyl ethers and to their preparation. More specifically, this invention relates to bis(2-hydroxy-3,5-substituted)benzyl ethers and to methods for their preparation.

The novel benzyl ethers of this invention are particularly suitable for use as plasticizers, antioxidants, light stabilizers, surface active agents, and the like. They possess physical and chemical properties which allow for their convenient formulation with a wide variety of organic solvents. The ethers also are suitable for use as fungicides, germicides, antiseptics, and the like. Specific applications include, for example, slime control in air conditioning systems, sewage treatment and the paper pulp industry and the like.

The ethers are prepared according to the following reaction:

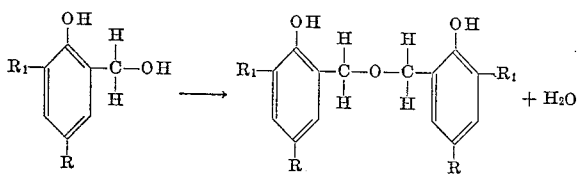

In the above formulas, R can be any of the substituents chlorine, fluorine, bromine, iodine, alkyl, cycloalkyl or aryl; and $R_1$ can be any of chlorine, fluorine, bromine, iodine, alkyl, cycloalkyl or aryl with the provision that only one of R and $R_1$ can be halogen on any given compound. When one of R or $R_1$ is a halogen, the other can be any of alkyl or cycloalkyl groups containing from 4 to 24 carbon atoms or an aryl group containing from 6 to 24 carbon atoms. When neither R nor $R_1$ is a halogen, either one can be an alkyl group having from 2 to 22 carbon atoms, a cycloalkyl substituent having from 4 to 22 carbon atoms or an aryl group having from 6 to 22 carbon atoms, provided that there is a total of between 8 and 24 carbon atoms present in the two substituents combined. Thus, the total number of carbon atoms in the R and $R_1$ substituents combined is at least 4 when one of these substituents is halogen and at least 8 when neither R nor $R_1$ is halogen.

The phenolic compounds used as the starting materials in the process of this invention can be prepared conveniently by the reaction of a substituted phenol having the formula:

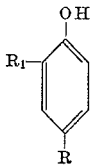

with formaldehyde. In the above formulas, R and $R_1$ have the values set forth above. This reaction is carried out in the presence of an alkaline catalyst such as, for example, sodium hydroxide, potassium hydroxide or alkaline borate.

The preparation of the benzyl ether, according to this invention, can be carried out by the thermal degradation of the corresponding phenolic compound with or without a catalyst, e.g., dilute acids such as, for example, HCl, $H_2SO_4$ or $C_6H_5SO_3H$ or salt solutions such as, for example, $NaHSO_4$, $NaHSO_3$ or $CaCl_2$, and the like.

In the specification, claims and following specific examples, all parts and percentages are by weight unless otherwise indicated. The following examples are set forth to further illustrate and not to limit the invention.

EXAMPLE I

A 5 gram sample (0.18 mole) of pure 2-chloro-4-isooctyl-6-methylol phenol dissolved in 35 ml. of acetone is refluxed for 45 minutes at approximately 65° C. in the presence of a solution consisting of 3 ml. of concentrated HCl in 10 ml. of water. After refluxing, the acetone solvent is evaporated, and the product is taken up in n-heptane. The entrained HCl is removed by washing with water. The dried crystalline product obtained on evaporating the n-heptane is found to contain the yellow ether dimer of 2-chloro-4-isooctyl-6-methylol phenol, bis(2-hydroxy-3-chloro-5-isooctyl)benzyl ether, as indicated by an increase at the 9.4μ infra-red band. The ether thus obtained, when dissolved in kerosene, provides an excellent germicidal composition.

EXAMPLE II

A solution of 5.62 grams of pure 2-chloro-4-isooctyl-6-methylol phenol dissolved in 19.38 grams of kerosene is reacted at 50° C. for 30 days. Paper chromatographic analysis of the product indicates the formation of the ether dimer of 2-chloro-4-isooctyl-6-methylol phenol. The ether thus obtained, when admixed with uncured phenol-formaldehyde resin, serves as an excellent plasticizer.

EXAMPLE III

A 5.62 gram sample of pure 2-chloro-4-isooctyl-6-methylol phenol is dissolved in a 19.38 gram sample of kerosene containing 0.62 gram of 2-chloro-4-isooctyl-phenol and is reacted at 50° C. for 30 days. Paper chromatographic analysis of the product indicates that the ether dimer of 2-chloro-4-isooctyl-6-methylol phenol is obtained.

In Examples IV through IX, the phenolic reactants indicated in Table I were reacted according to the above procedures to produce the benzyl ether indicated.

TABLE I

| Example | Phenolic Reactant | Benzyl Ether |
|---|---|---|
| IV | 2-bromo-4-tert-butyl-6-methylolphenol. | Bis(2-hydroxy-3-bromo-5-tert-butyl)benzyl ether. |
| V | 2-iodo-4-cyclohexyl-6-methylolphenol. | Bis(2-hydroxy-3-iodo-5-cyclohexyl)benzyl ether. |
| VI | 2-cyclohexyl-4-chloro-6-methylolphenol. | Bis(2-hydroxy-3-cyclohexyl-5-chloro)benzyl ether. |
| VII | 2-methyl-4-nonyl-6-methylolphenol. | Bis(2-hydroxy-3-methyl-5-nonyl)benzyl ether. |
| VIII | 2-nonyl-4-bromo-6-methylolphenol. | Bis(2-hydroxy-3-nonyl-5-bromo)benzyl ether. |
| IX | A mixture of 2-chloro-4-octyl-6-methylol-phenol and 2-chloro-4-nonyl-6-methylolphenol. | A mixture of bis(2-hydroxy-3-chloro-5-octyl)benzyl ether, bis(2-hydroxy-3-chloro-5-nonyl)benzyl ether and 2,2'-dihydroxy-3,3'-dichloro-5-octyl-5'-nonyldibenzyl ether. |

Satisfactory results are also obtainable by substituting any one or more of the following phenolic reactants for the phenolic reactants in the above examples:

2-iodo-4-dodecyl-6-methylolphenol,
2-(2,4,6-pentylbenzyl)-4-methyl-6-methylolphenol,
2-butyl-4-butyl-6-methylolphenol,
2,4-diisopropyl-6-methylolphenol,
2-bromo-4-nonyl-6-methylolphenol,
2-fluoro-4-nonyl-6-methylolphenol,
2-chloro-4-phenyl-6-methylolphenol,
2-chloro-4-tertiarybutyl-6-methylolphenol,
2-bromo-4-phenyl-6-methylolphenol, 2-chloro-4-(1,1,3,3-tetramethylbutyl)-6-methylolphenol,
2-bromo-4-isooctyl-6-methylolphenol,
2-cyclohexyl-4-chloro-6-methylolphenol,
2,4-disec-amyl-6-methylolphenol,
2,4-dinonyl-6-methylolphenol,
2,4-di(tertiarybutyl)-6-methylolphenol,
2,4-ditert-amyl-6-methylolphenol,
2,4-di(secondaryamyl)-6-methylolphenol,
2-ethyl-4-phenyl-6-methylolphenol,
2-butyl-4-bromo-6-methylolphenol, mixtures of two or more of these phenolic compounds, and the like.

The organic substituents from which R and $R_1$ can be selected can each be independently chosen from the following illustrative, but not all inclusive, list of organic substituents: alkyl substituents such as ethyl, methyl, isoamyl, neopentyl, decyl, hexyl, propyl, 2-methylpentyl, 5-methylhexyl, pentyl, dodecyl, butyl; cycloalkyl substituents such as cyclopentyl, cyclohexyl, cycloheptyl, p-methylcyclohexyl, 3-ethylcyclopentyl, 3,5-dimethylcyclopentyl, cyclobutyl; aryl substituents such as 2,4-xylyl, m-cumenyl, phenyl, mesityl, biphenylyl, naphthyl, indanyl, tolyl and the like.

Preferred phenolic reactants, according to this invention, are those wherein R is an alkyl or cycloalkyl substituent having from 4 to 12 carbon atoms and $R_1$ is a halogen atom. These preferred compounds are soluble in and compatible with a wide range of solvents.

The most preferred phenolic reactant is 2-chloro-4-isooctyl-6-methylolphenol.

In preparing benzyl ethers according to this invention, it is necessary to avoid reaction conditions which will cause the ethers to degrade further to other products. Generally, small amounts of the corresponding alkylene dimers and also small amounts of other degradation products are produced along with the benzyl ether during the heating step. To minimize the formation of these undesirable products, this process should be conducted at a temperature between about 15° C. and about 70° C., preferably between about 45° C. and about 65° C.

The heating step should be terminated as soon as possible since prolonged heating tends to increase the amount of undesirable degradation by-products in the reaction mixture. The length of reaction time varies widely with such factors as the specific reactants, reaction temperature and the use of a catalyst. Thus, reaction time can vary from about 20 minutes to more than a month. To determine the proper reaction time for any given system, it is necessary to analyze the reaction mixture, as for example, by paper chromatographic analysis as set forth in Example III, to determine when the desired amount of benzyl ether is achieved. Conventional analytical procedures can be utilized for this purpose. The time of reaction is adjusted accordingly so as to recover the maximum amount of the desired benzyl ether from the degradation product. The recovered benzyl ether can be isolated from the other degradation products by conventional separation techniques such as, for example, solvent extraction, fractional crystallization, distillation and the like.

The use of a catalyst generally shortens the reaction time considerably, but has little effect on the formation of undesirable by-products.

When heat is applied to the benzyl ethers of this invention, they degrade to the corresponding alkylene dimers with the evolution of formaldehyde. This characteristic makes these benzyl ethers particularly suitable for use as plasticizers in synthetic resin formulations which are cured by heat treatment. At the elevated temperatures reached during curing, these benzyl ethers degrade to the corresponding alkylene dimers with the evolution of formaldehyde. When these compounds are used as plasticizers in resin formulations which are cured or crosslinked by formaldehyde, the evolution of this additional formaldehyde, near the end of the curing cycle, results in improved physical properties in the cured resin.

As will be understood by those skilled in the art, what has been described is the preferred embodiment of the invention. However, many modifications, changes, and substitutions can be made therein without departing from the scope and spirit of the following claim.

What we claim is:

1. A process for producing benzyl ethers comprising:
  (A) heating at a temperature between about 45° C. and about 65° C., in the presence of a catalytic amount of a catalyst selected from the group consisting of a HCl, $H_2SO_4$, $C_6H_5SO_3H$, $NaHSO_4$, $NaHSO_3$ and $CaCl_2$, a phenolic compound having the formula:

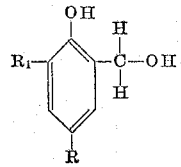

wherein R is an alkyl substituent having from 4 to 12 carbon atoms, and $R_1$ is a halogen to form a degradation product, and (B) recovering said benzyl ether from the resultant degradation product, said benzyl ether having the formula:

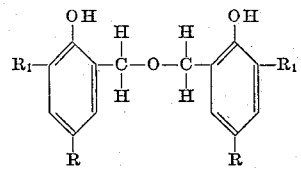

wherein, R and $R_1$ have the meaning assigned above.

References Cited

Euler et al.: Chem. Abstracts, vol. 36 (1942), pp. 7182–7184.

Hultzsch, J. Prakt.: Chem., vol. 159 (1941), pp. 155–179, the abstract of which is Hultzsch, Chem. Abstracts, vol. 37 (1943), pp. 4059–4060.

Marsh et al.: Ind. and Eng. Chem., vol. 41 (1949), pp. 2176–2184 (p. 2182 relied on).

BERNARD HELFIN, *Primary Examiner.*

LEON ZITVER, *Examiner.*